J. O. TENSFELDT.
DRIER.
APPLICATION FILED NOV. 18, 1919.
1,349,590.
Patented Aug. 17, 1920.
2 SHEETS—SHEET 1.
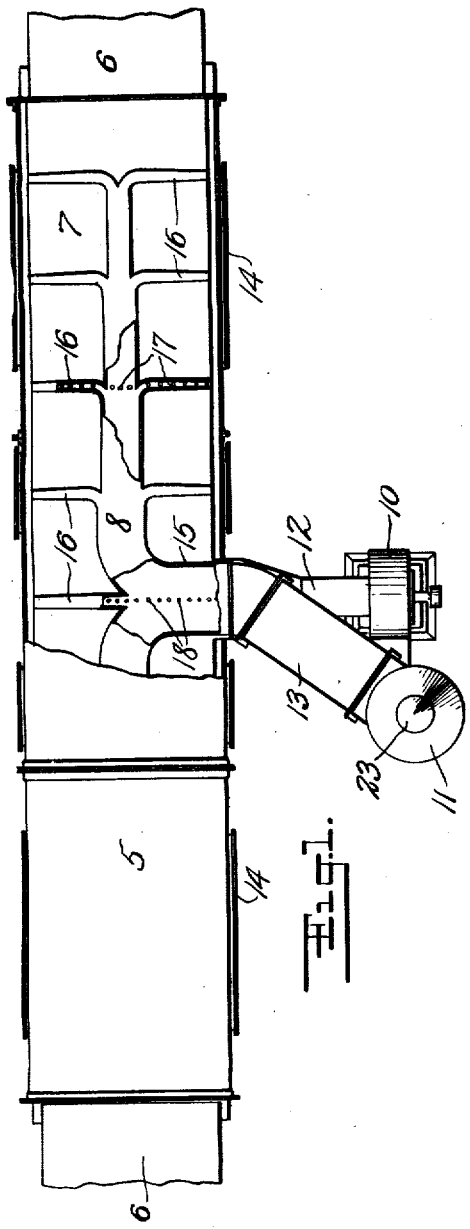
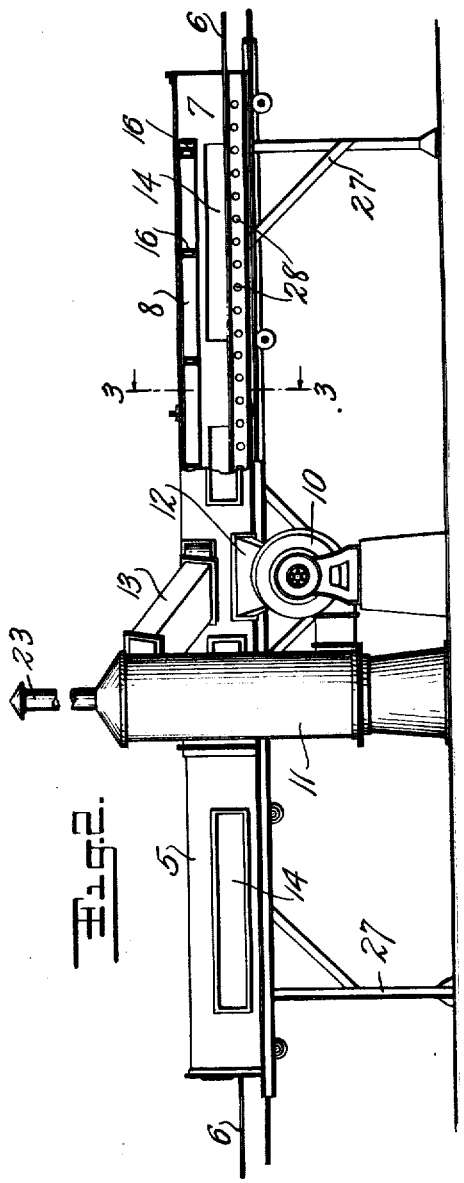
Inventor
John O. Tensfeldt
By his Attorney
Garry P. Van Wye J. O. TENSFELDT.
DRIER.
APPLICATION FILED NOV. 18, 1919.
1,349,590.
Patented Aug. 17, 1920.
2 SHEETS—SHEET 2.
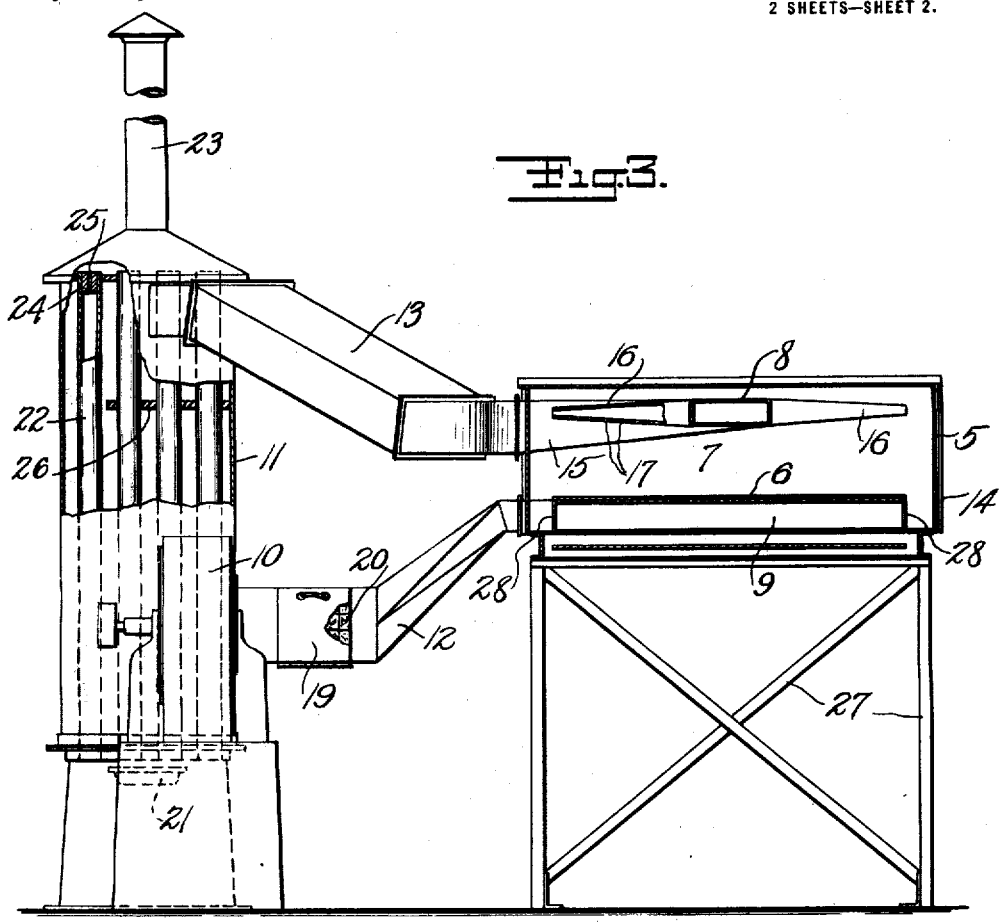
Inventor
John O. Tensfeldt
By his Attorney
Garry P. Van Wye

UNITED STATES PATENT OFFICE.

JOHN O. TENSFELDT, OF RIDGEWOOD, NEW JERSEY.

DRIER.

1,349,590.	Specification of Letters Patent.	Patented Aug. 17, 1920.

Application filed November 18, 1919. Serial No. 338,833.

*To all whom it may concern:*

Be it known that I, JOHN O. TENSFELDT, a citizen of the United States, residing at Ridgewood, in the county of Bergen and State of New Jersey, have invented a new and useful Drier, of which the following is a specification.

This invention relates to drying machines; and has for its object to provide a drier in which the air will be dried and heated efficiently; and when heated, will be distributed in the machine in an efficient manner without loss of necessary energy.

The invention is illustrated in the accompanying drawings, in which—

Figure 1, is a plan view, with parts broken away, and parts in section, of a drier constructed in accordance with my invention;

Fig. 2, is a side elevation of the same, with parts broken away;

Fig. 3, is a sectional view, on an enlarged scale, on the line 3—3 of Fig. 2; and Fig. 4, is a side view of a drying cartridge I may use.

In the drawing, like numerals of reference refer to the same parts in each of the views.

In practice I provide a chamber 5, through which may be passed a conveyer 6 for the purpose of carrying the material to be dried through the chamber 5. Within the chamber 5 I provide the drying chamber proper 7, through which the material is carried, the heated air distributer 8, and the return chamber 9 adapted to receive the air and moisture after passing over the material being dried.

I also provide a fan, or blower 10, a heater 11, a flue 12 leading from the chamber 9 to the blower, and a flue 13 leading from the heater to the air distributer 8.

The drying chamber proper may be provided with side doors 14 for the inspection of the material at different points.

The heated air distributer lies wholly within the chamber 5; and comprises a main flue 15, which is divided as shown in Fig. 1, at the outer end. At intervals along this flue I provide side arms, or flues 16, the bottoms of which are perforated at intervals, as clearly shown, the perforations 17 extending across the main flue so that the heated air is delivered at intervals along the distributer, and in a downward direction on the material carried by the conveyer. I prefer, also, to provide a plurality of perforations 18 in the part 15 of the distributer.

The return flue 12 may be provided with a door 19 for the admission of a drying cartridge 20, of any desired construction and material for the extraction of the moisture from the air taken from the material being dried before the air goes to the heater, and is reheated for use in the drier.

The heater is preferably provided with a gas burner 21, flues 22, and a chimney 23. The air from the drier is adapted to pass around the flues, or tubes 22, to the top of the heater from whence it can pass to the flue 13, and from thence back to the distributer 8. The heating effect of the tubes, or flues 22, is greatly increased by mounting a plug 24 in the top of each tube, and providing a small passageway 25 therethrough so the products of combustion from the burning gas, and the hot air will be held within the tubes in a baffled manner. I may also mount a number of baffle plates 26 within the heater, as will be understood.

The drier may be mounted on a suitable frame 27 that it may be held at a desired height.

In operation, the material to be dried is carried through the drying chamber in the chamber 7 by the conveyer. The heated air is directed downwardly upon this material, and after covering the same the air passes outwardly, and thence through the perforations 28 to the chamber 9 beneath the material being dried so that heat is applied underneath the drying material as well as directly upon the same; and all the parts are carried within the chamber 5 so that there is no loss of heat after the air reaches the drier. As the moisture is extracted from the air before the same is reheated, nothing but heated air is delivered to the material being dried; and that air is directed downwardly upon the material so that the same is used in the most efficient manner. It will thus be seen that I have made a drier that is simple in construction, cheap to manufacture, and efficient in use.

I claim:

1. In a drier, an air distributer comprising a longitudinal channel, and a plurality of side channels arranged at intervals and provided with perforations in the bottom thereof whereby the heated air is delivered at intervals and in a downward direction.

2. A drier comprising a chamber having mounted therein: a drying chamber, a distributer of heated air, and a chamber beneath said drying chamber adapted to receive air from the same, said drier having means connected therewith for heating and circulating air through said chamber, said distributer comprising a longitudinal channel, and a plurality of side channels arranged at intervals and provided with perforations in the bottom thereof whereby the heated air is delivered at intervals and in a downward direction.

3. A drier comprising a chamber having mounted therein: a drying chamber, a distributer of heated air, and a chamber beneath said drying chamber adapted to receive moistened air from the same, said drier having means connected therewith for circulating the air through said chamber, extracting the moisture from the air, and heating the air, said distributer comprising a longitudinal channel and a plurality of side channels arranged at intervals and provided with perforations in the bottom thereof whereby the heated air is delivered at intervals and in a downward direction.

4. In a drier, an air distributer comprising a longitudinal channel, and a plurality of side channels arranged at intervals, said distributer being provided with perforations at intervals in the bottom thereof coincident with the side channels and extending into the same, means to pass air through said distributer, and means to extract the moisture from the air prior to passing it through the distributer.

5. A drier comprising a drying chamber, means to extract air from the same, means to extract the moisture from the air contained in said chamber, means to reheat the dried air, and means to distribute the heated air through the drying chamber comprising a main channel traversing the drying chamber, and a plurality of side channels communicating with the main channel, said side channels being provided with perforations in the bottom thereof.

6. A drier comprising a drying chamber and means to pass the material to be dried therethrough, a chamber beneath said drying chamber and means to pass air from said drying chamber to the lower chamber, means to draw air from said lower chamber, means to extract the moisture from said air, means to reheat the dried air, and means to distribute the heated air through the drying chamber comprising a main channel traversing the drying chamber, and a plurality of side channels communicating with the main channel, said side channels being provided with perforations in the bottom thereof.

7. A drier comprising a drying chamber, means to extract air from the same, means to extract moisture from the air contained in said chamber after extraction, means to reheat the dried air, and means to distribute the heated air through the drying chamber comprising a main channel entering the drying chamber centrally thereof and extending in both directions, and a plurality of side channels communicating with the main channel, said side channels being provided with perforations in the bottom thereof.

8. A drier comprising a drying chamber, means to extract air from the same, means to extract the moisture in said air, means to reheat the dried air, and means to distribute the heated air through the drying chamber comprising a main channel entering said drying chamber centrally thereof and extending in two directions toward the ends of the drying chamber, and side channels on each side of the main channel and in communication therewith, said side channels being provided with perforations in the bottom thereof, the bottom of the main channel being perforated at intervals whereby the perforations in the main channel are in line with the perforations in the bottom of the side channels.

9. A drier comprising a drying chamber, means to extract air from the same, means to extract moisture from said air, means to reheat the dried air, and means to distribute the heated air through the drying chamber comprising a main channel extending from end to end of the drying chamber and side channels in communication with the main channel arranged at intervals along each side of the main channel, said main channel and side channels having perforations in the bottom thereof, said drier having doors arranged along the sides thereof whereby access can be had to any part of the drying chamber.

Dated this 15th day of November, 1919.

JOHN O. TENSFELDT.